No. 878,544.
PATENTED FEB. 11, 1908.
M. LEITCH.
WASHING APPARATUS.
APPLICATION FILED FEB. 11, 1907.
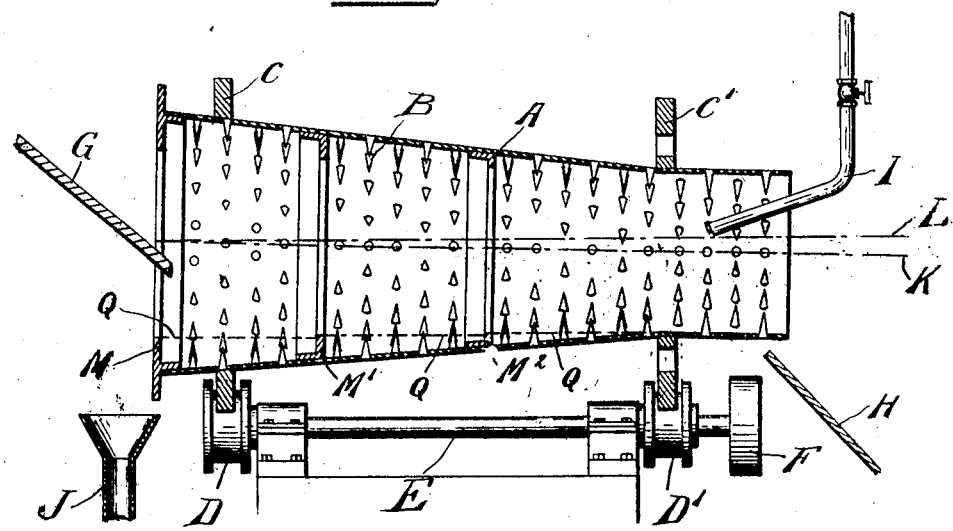
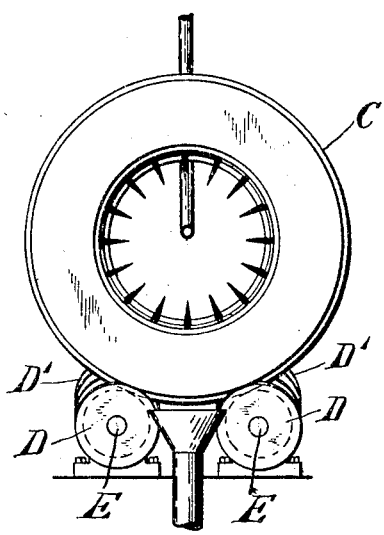
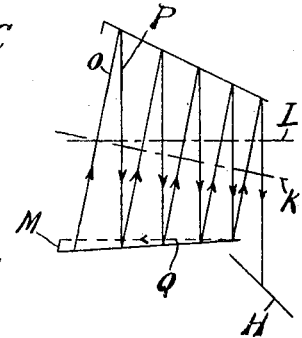
Witnesses:
Inventor
MEREDITH LEITCH
By his Attorneys

UNITED STATES PATENT OFFICE.

MEREDITH LEITCH, OF ELIZABETH, NEW JERSEY, ASSIGNOR, BY MESNE ASSIGNMENTS, TO METAL PROCESS COMPANY, A CORPORATION OF NEW YORK.

WASHING APPARATUS.

No. 878,544.  Specification of Letters Patent.  Patented Feb. 11, 1908.

Application filed February 11, 1907. Serial No. 356,688.

*To all whom it may concern:*

Be it known that I, MEREDITH LEITCH, a citizen of the United States, residing at Elizabeth, Union county, New Jersey, have invented certain new and useful Improvements in Washing Apparatus, of which the following is a full, clear, and exact description.

My invention relates to washing apparatus and has for its object to provide an apparatus in which the material to be washed will be automatically moved from the point of entry to the point of discharge and during such movement will advance in the opposite direction to the flow of washing water.

It is particularly designed for washing black scrap tin, my purpose being to wash the tin after it has come from the caustic soda solution of a detinning apparatus, and thereby not only cleanse the tin but save the caustic soda. By causing the scrap to move in the opposite direction to the flow of the water, it is first subjected to water containing caustic soda, for instance, 3%, and then subjected to water containing less caustic soda, say, 2%, and so on until it meets fresh water. The last washing is, therefore, with fresh water. The water as it leaves the apparatus contains the most caustic soda and can be conveyed to a suitable evaporator or other device for reclaiming the caustic soda. In my apparatus the flow of water is continuous and the charging and discharging of the tin scrap are preferably continuous.

The following is a description of apparatus embodying my invention, reference being had to the accompanying drawings, in which Figure 1 is a horizontal vertical section through the center of the apparatus, Fig. 2 is an end view of the apparatus on a plane at right angles to the axis of the cylinder, but slightly inclined to the horizontal. Fig. 3 is a diagrammatic view showing the course of a piece of scrap and water in passing through a rotating cylinder whose axis and sides are oppositely inclined to the horizontal.

Referring more particularly to the drawings, A is a water-tight tapering shell, preferably, though not necessarily, gradually tapering and conical in form and made of sheet steel. Within it is a series of studs or projections B, which, as the shell revolves, assist in carrying the scrap up toward the top of the shell to a point from whence it falls to the bottom. This shell is provided with circular projections C C', which rest upon wheels D D D' D' carried by the shafts E E. A pulley F is provided for driving one of the shafts E.

G is a charging chute whereby material to be washed is introduced into the shell.

H is a chute receiving the scrap as it is delivered from the shell.

I is a conduit for supplying the water.

J is a funnel for receiving the water as it flows from the shell and conveying it to an evaporator or other suitable reclaiming apparatus.

The projections C C' are concentric with the axis of the shell or cylinder A, the projection C' being of slightly smaller diameter than the projection C. The wheels D' are also slightly smaller in diameter than the wheels D. The result is that the axis of the shell, represented by the dotted line K, does not coincide with the horizontal line L, the axis K at the discharge end of the shell being considerably lower than at the receiving end and nearer to the peripheries of the wheels at the discharge end than it is to the peripheries of the wheels at the receiving end. The taper of the shell is such that when mounted with its axis inclined as just described, the bottom at the left hand end is lower than at the right hand end, so that water introduced at I will flow toward M.

As is evident in Figs. 1 and 3, the axis and bottom of the shell are on opposite sides of a horizontal plane passing through the apex of the angle which they form; that is, a horizontal plane passing through the apex of that angle lies between its sides. Thus, in a shell eight feet long, the axis at the discharge end would be about 2 inches lower than at the receiving end. In such a shell, the pins or studs B should be preferably about four inches apart, so as to aid in lifting the material and causing it to progress. At the receiving end of the shell and at other points along its body are circular flanges M, M', M², which act as dams to separate the water Q containing different amounts of caustic soda, thus producing fields of different densities. In the water between flanges M and M' the caustic soda would be most dense, say, for instance, 3%. In the space between the flanges M' and M², the caustic soda solution would be less dense, and in the space between the flanges M² and the right hand end, the caustic soda solution would be still less dense. As the scrap is fed into the left hand end of the shell, it is moved upward in a plane at right angles to the axis of the shell, as illustrated at O in Fig. 3. As it falls back, it falls in a vertical line, as illustrated at P, in Fig. 3. It then rises through a plane parallel to that represented by the line O and falls then through a plane parallel to that represented by the line P, rising and falling and progressing each time until it falls into the chute H. The water it first encounters contains the highest amount of caustic soda, as it progresses it encounters water containing a smaller percentage of caustic soda solution. As it leaves the washer, it is subjected to pure water and is quite clean. When the water leaves the washer it has the greatest amount of caustic soda in the solution.

The action of the apparatus is entirely automatic after the material has once been introduced and constitutes a very simple, efficient and economical means for producing the results desired.

By increasing the angle between the cylinder and the horizontal, the scrap can be made to pass more rapidly through it. The rate of longitudinal movement also depends upon the rate at which the cylinder revolves.

What I claim is:

1. In a washing apparatus, the combination of a gradually increasing shell mounted so as to have its axis at the smaller end of the shell lower than at its larger end and its bottom at the larger end lower than the smaller end, means for introducing water into said cylinder and means for causing said cylinder to revolve.

2. In a washing apparatus, the combination of a gradually increasing shell mounted so as to have its axis at the smaller end of the shell lower than at its larger end and its bottom at the larger end lower than at the smaller end, means for introducing water into said cylinder and means for causing said cylinder to revolve, said shell having a retarding flange for holding back the water.

3. In a washing apparatus, the combination of a gradually increasing shell mounted so as to have its axis at the smaller end of the shell lower than at its larger end and its bottom at the larger end lower than at the smaller end, means for introducing water into said cylinder and means for causing said cylinder to revolve, said shell having a series of retarding flanges for producing a plurality of fields of water.

4. In a washing apparatus, the combination of a gradually increasing shell mounted so as to have its axis at the smaller end of the shell lower than at its larger end and its bottom at the larger end lower than at the smaller end, means for introducing water into said cylinder and means for causing said cylinder to revolve, said shell having internal projections.

5. In a washing apparatus, the combination of a gradually increasing shell mounted so as to have its axis at the smaller end of the shell lower than at its larger end and its bottom at the larger end lower than at the smaller end, means for introducing water into said cylinder and means for causing said cylinder to revolve, said shell having external projections concentric with its axis, and revoluble wheels on which said projections rest.

6. In a washing apparatus, the combination of a shell gradually increasing in size mounted so as to have its axis at its smaller end lower than at its larger end, and its bottom at its larger end lower than at its smaller end, means for introducing water into said cylinder at its smaller end, external projections upon said shell concentric with its axis, and revoluble wheels on which said projections rest, the wheels at the smaller end being of less diameter than the wheels at the other end, and having their peripheries at a less distance from the axis of the shell.

7. In a washing apparatus, means for causing the material to be washed to repeatedly move upward through planes inclined to the horizontal and permitting said material when lifted to fall by gravity, and means for subjecting said material to water when in its lowermost position.

8. In a washing apparatus, the combination of an inclined surface and means for repeatedly lifting the material operated on from said inclined surface upwardly through planes inclined to the horizontal and permitting said material when so lifted to fall by gravity upon said inclined surface, the upper end of said inclined surface being in the direction toward which the material progresses.

9. In a washing apparatus, the combination of an inclined surface and means for repeatedly lifting the material operated on from said inclined surface upwardly through planes inclined to the horizontal and permitting said material when so lifted to fall by gravity upon said inclined surface, the upper end of said inclined surface being in the direction toward which the material progresses, and means for holding water at the lower end of said surface.

MEREDITH LEITCH.

Witnesses:
 HARRY L. SODERN,
 DABNEY LEITCH.